Sept. 9, 1947.  P. SCHMIDT ET AL  2,427,163
MEANS FOR INCREASING THE EFFICIENCY OF
FULL-FASHIONED KNITTING MACHINES
Filed May 23, 1941   12 Sheets-Sheet 1
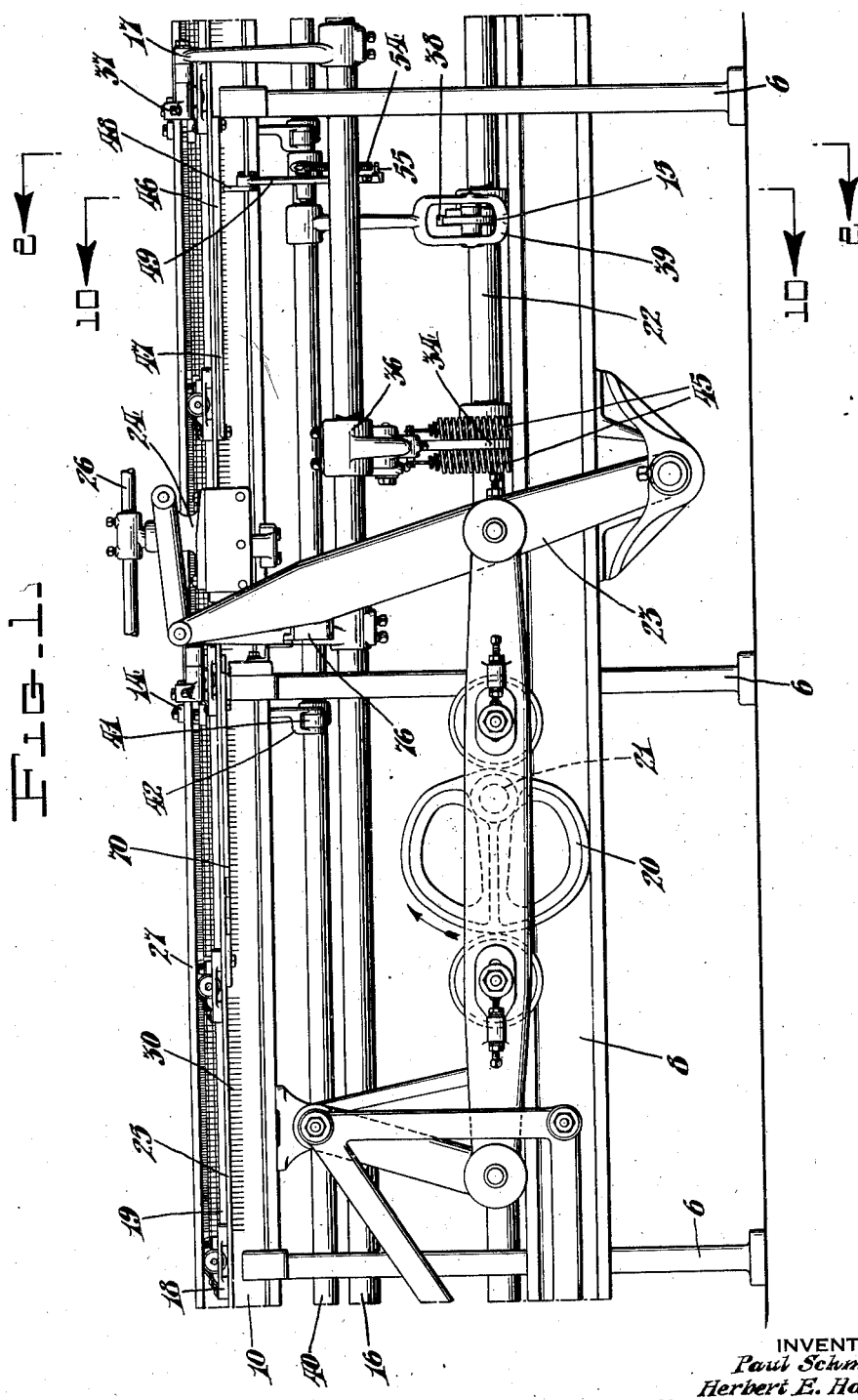
INVENTOR:
Paul Schmidt &
Herbert E. Haehnel,
BY
Alfred E. Ischinger
ATTORNEY.

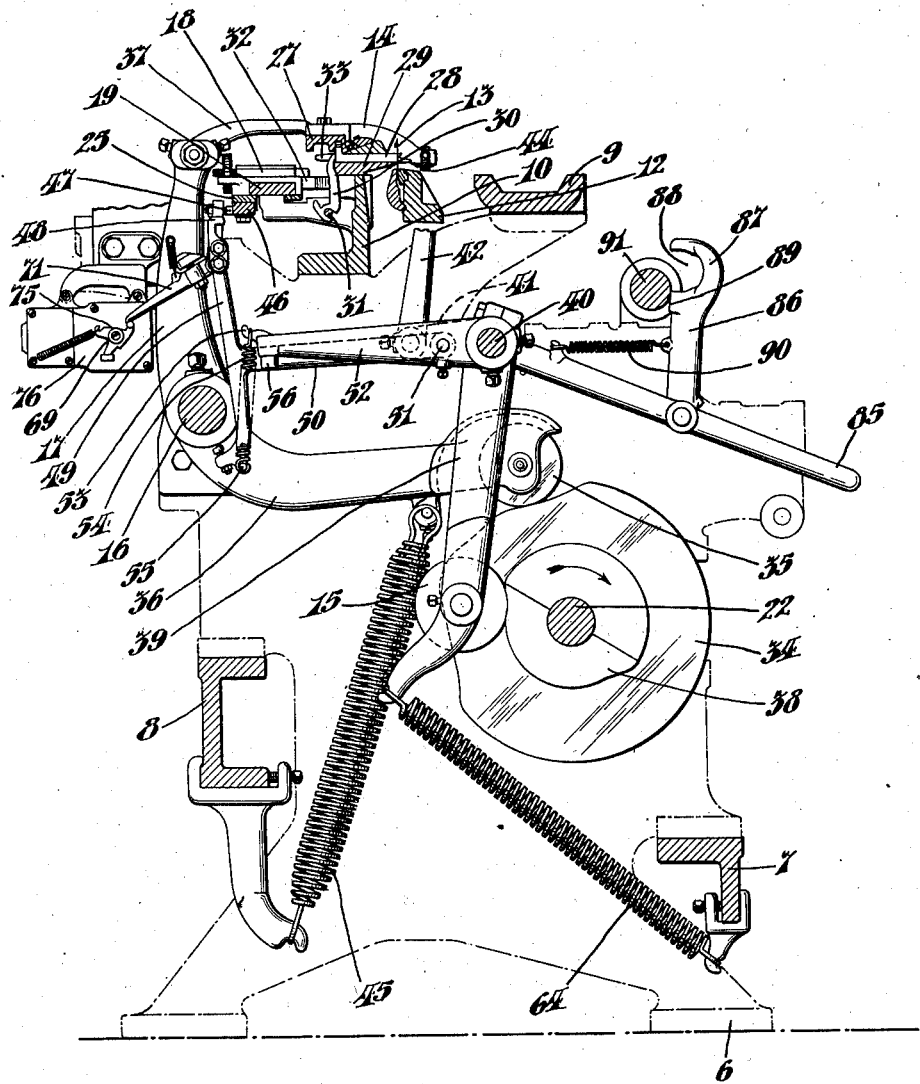

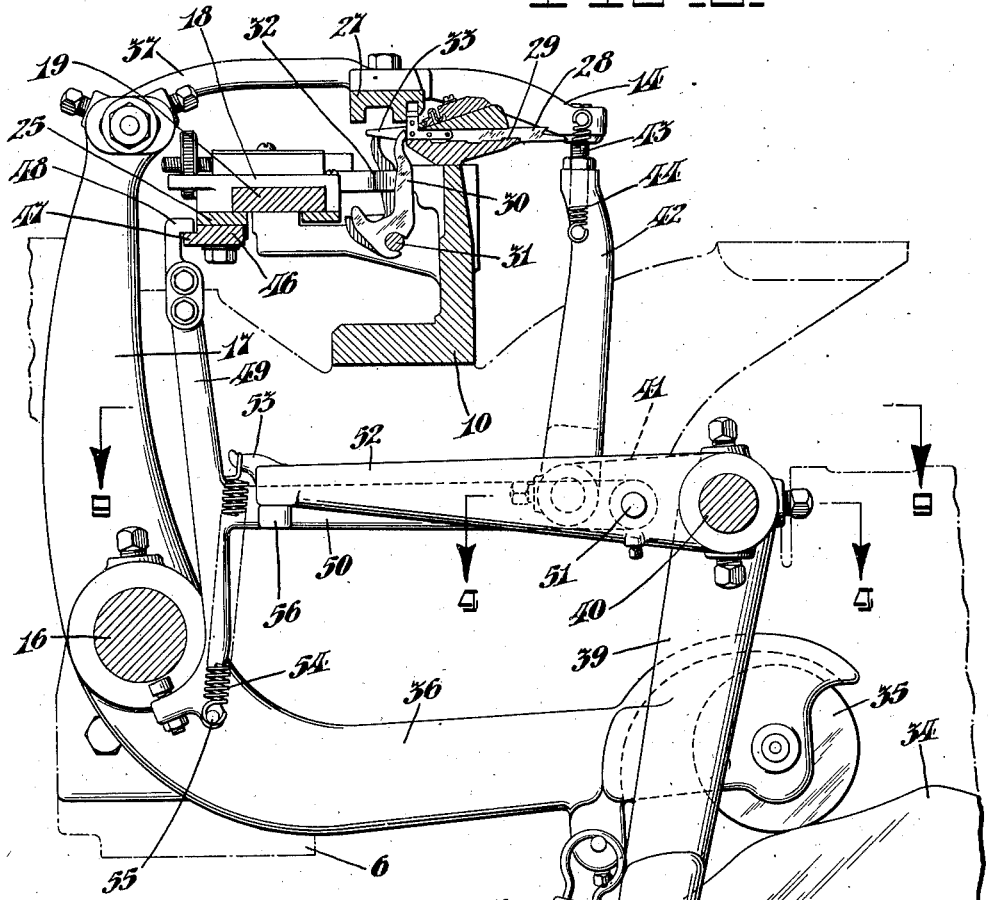
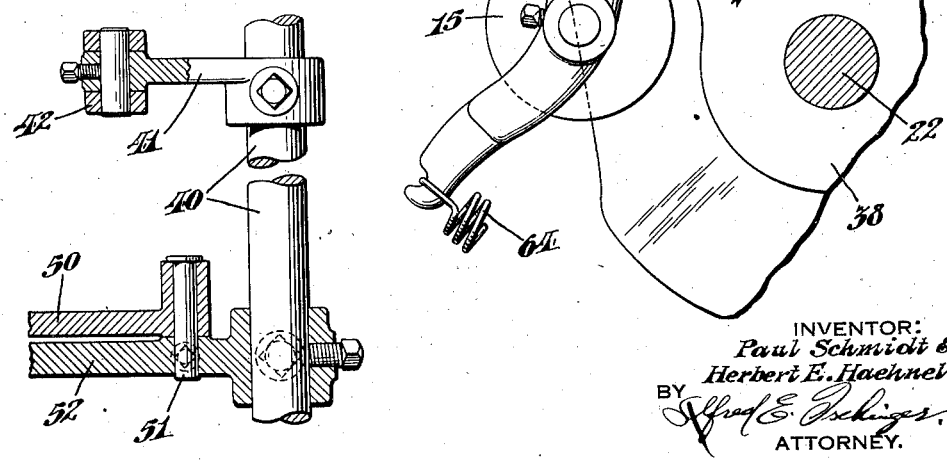

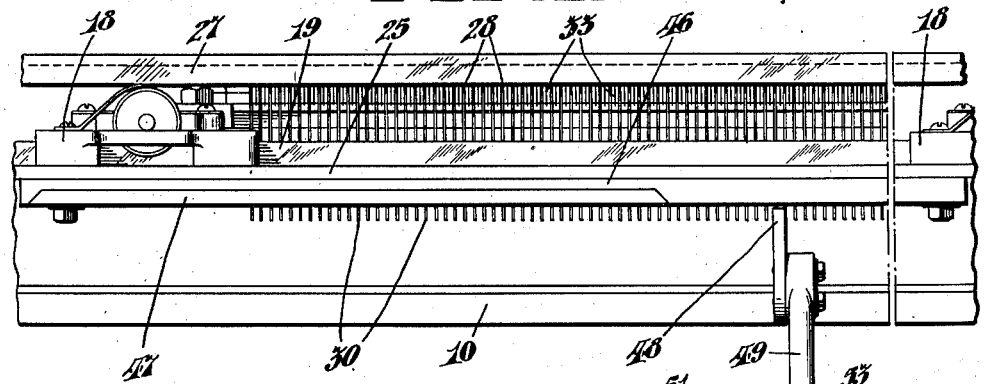
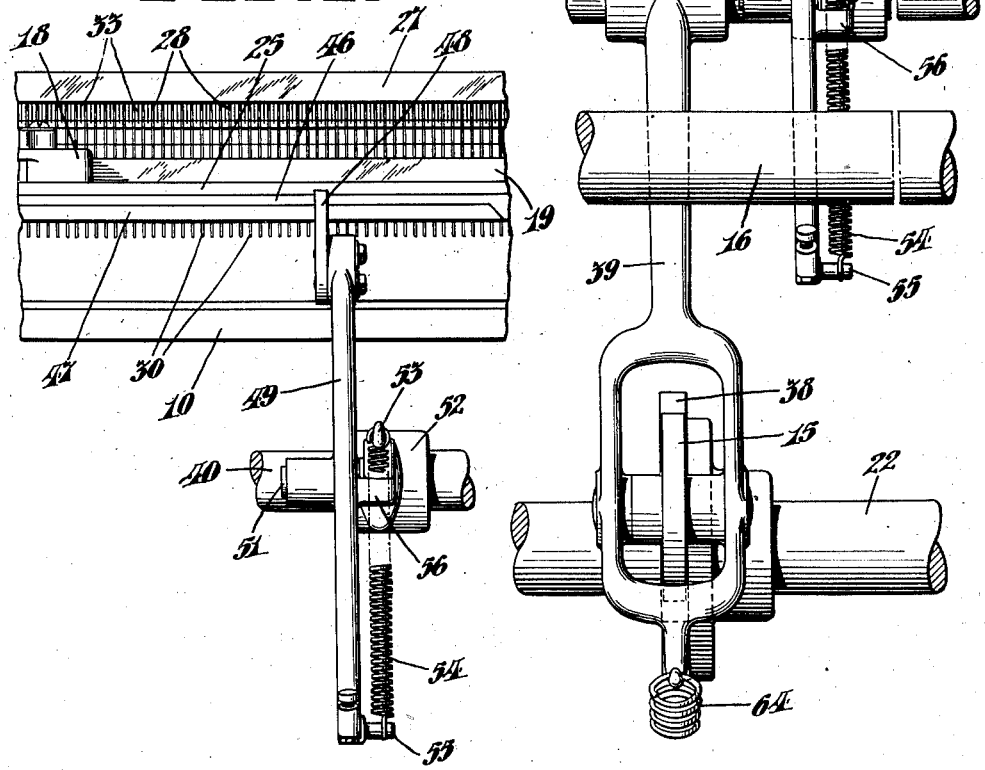

Sept. 9, 1947. P. SCHMIDT ET AL 2,427,163
MEANS FOR INCREASING THE EFFICIENCY OF
FULL-FASHIONED KNITTING MACHINES
Filed May 23, 1941 12 Sheets-Sheet 5
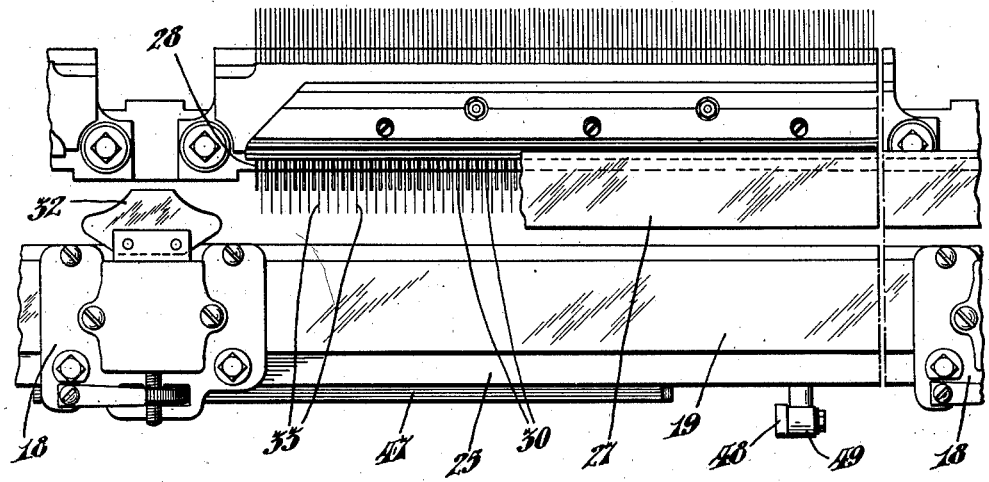
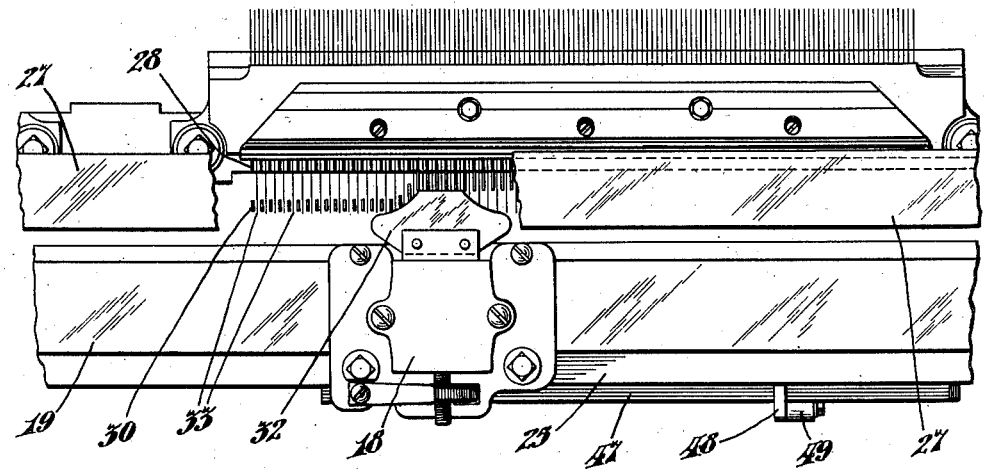
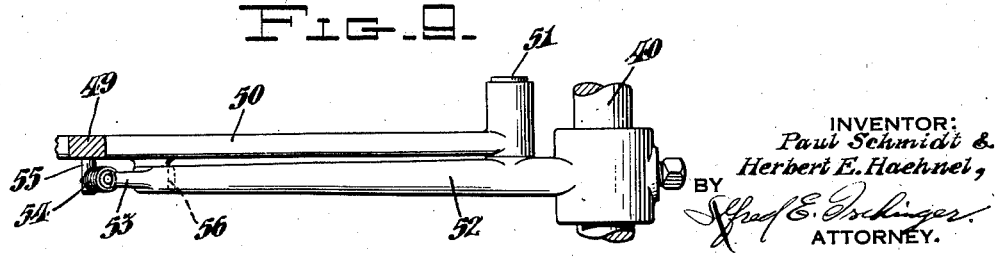
INVENTOR:
Paul Schmidt &
Herbert E. Haehnel,
BY
ATTORNEY.

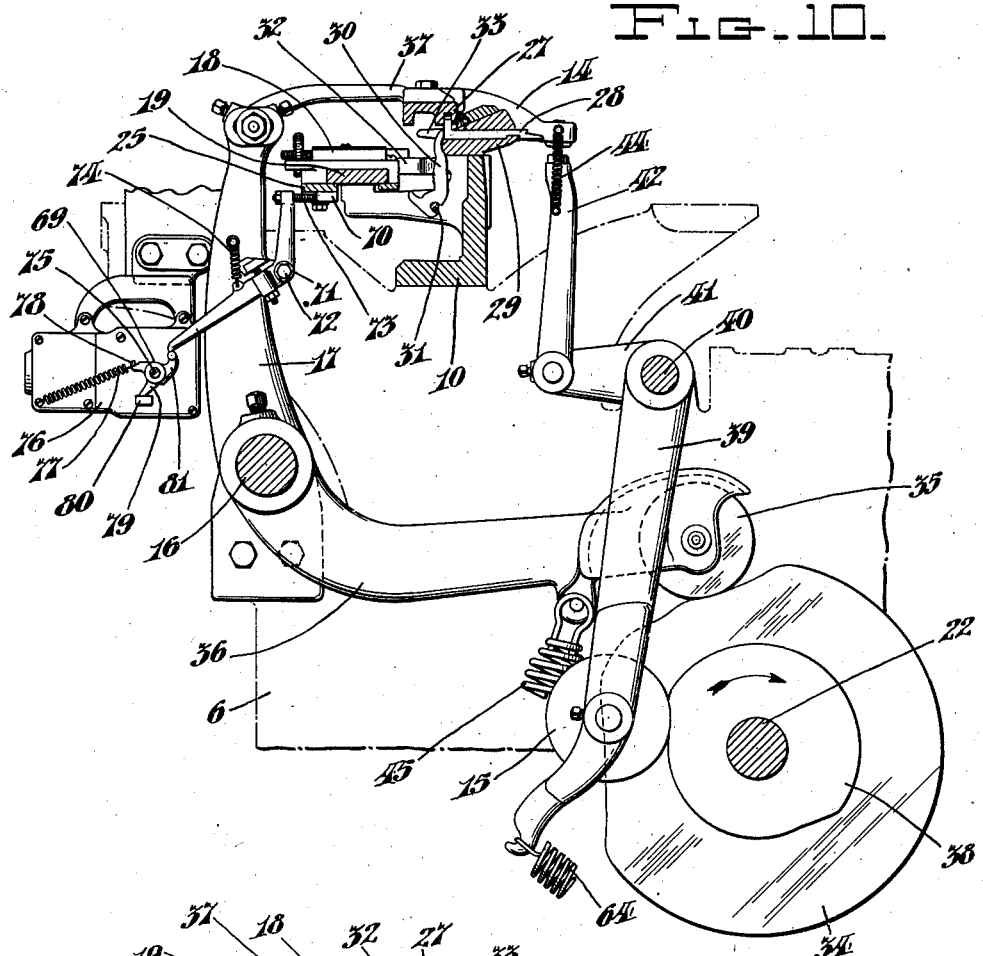

INVENTOR:
Paul Schmidt &
Herbert E. Haehnel,
BY
ATTORNEY.

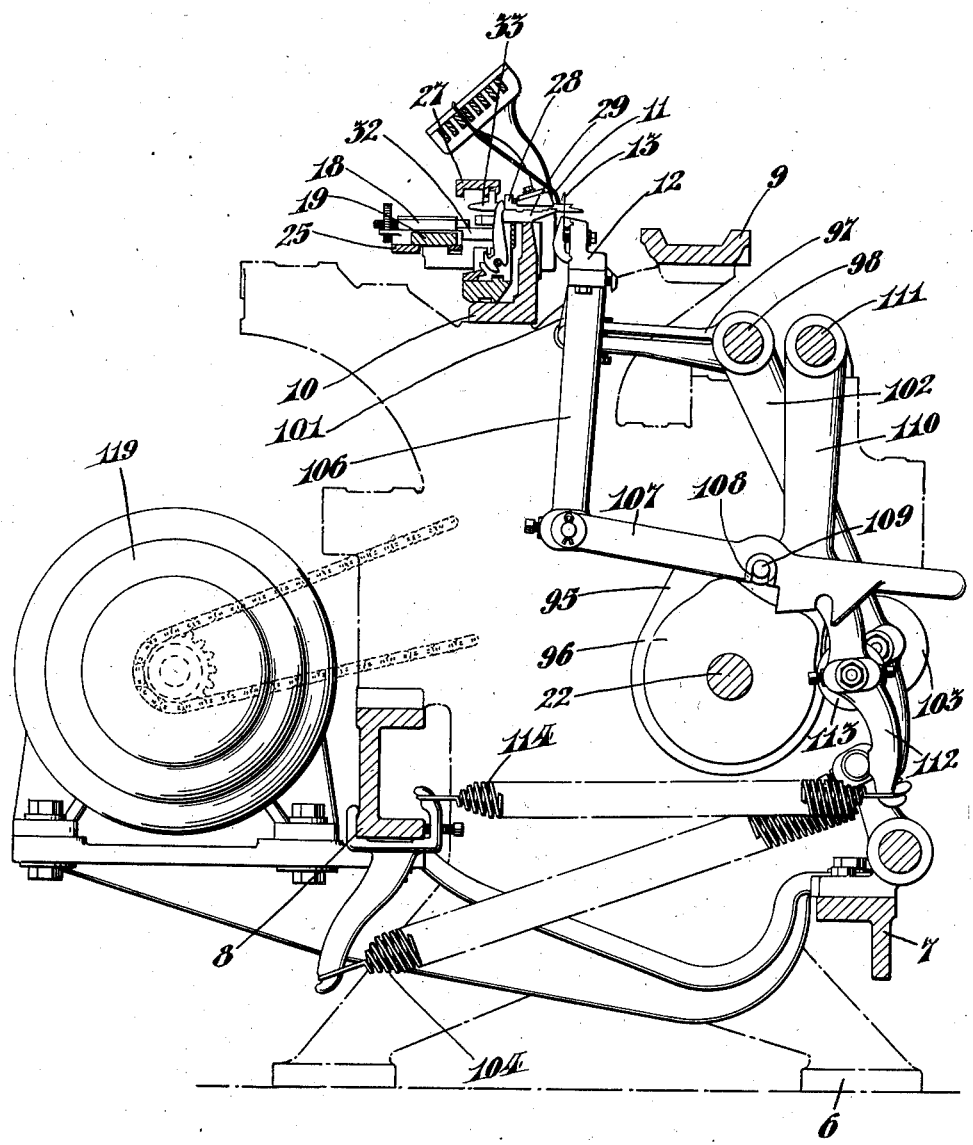

Sept. 9, 1947.  P. SCHMIDT ET AL  2,427,163
MEANS FOR INCREASING THE EFFICIENCY OF
FULL-FASHIONED KNITTING MACHINES
Filed May 23, 1941  12 Sheets-Sheet 9
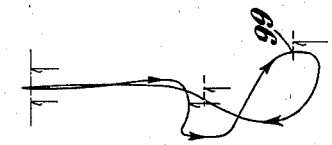
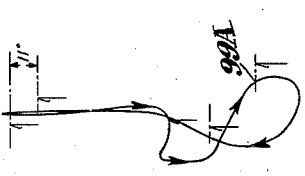
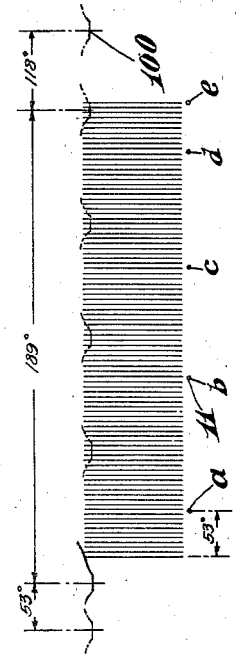
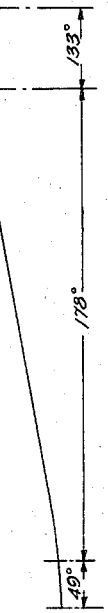
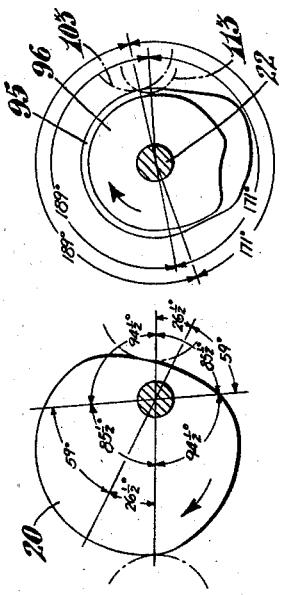
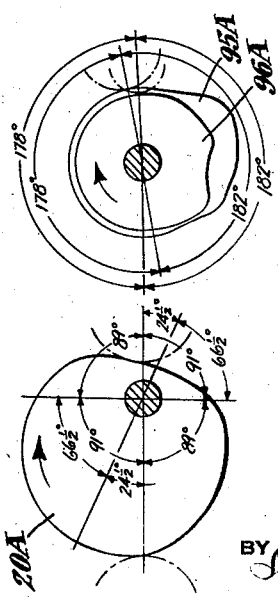
INVENTOR:
Paul Schmidt &
Herbert E. Haehnel,
BY
ATTORNEY.

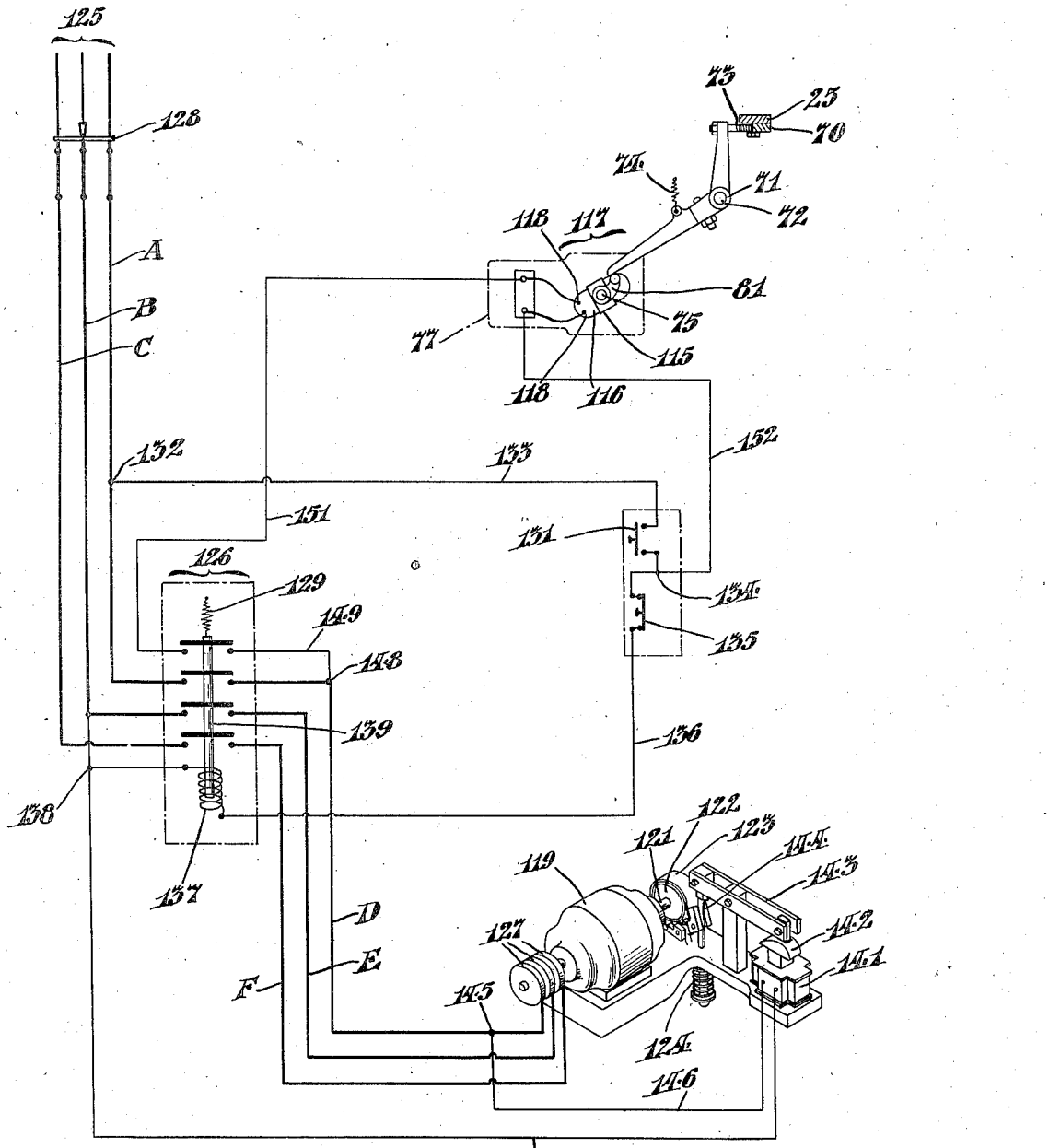

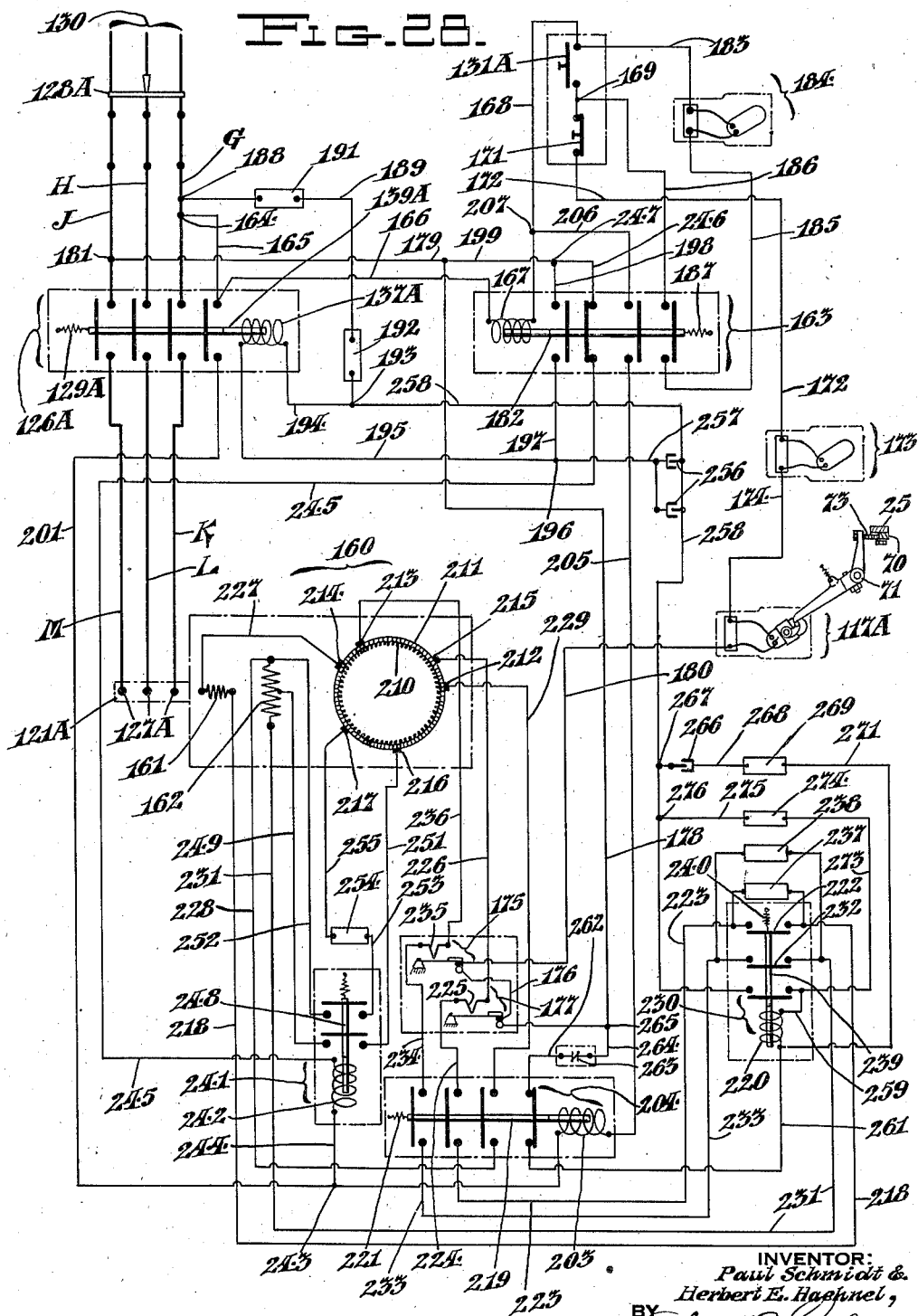

Patented Sept. 9, 1947

2,427,163

UNITED STATES PATENT OFFICE 2,427,163

MEANS FOR INCREASING THE EFFICIENCY OF FULL-FASHIONED KNITTING MACHINES

Paul Schmidt, Wytheville, Va., and Herbert E. Haehnel, West Reading, Pa., assignors to Textile Machine Works, Wyomissing, Pa., a corporation of Pennsylvania Application May 23, 1941, Serial No. 394,770

5 Claims. (Cl. 66—82)

Our invention relates to straight knitting machines, and more particularly to full-fashioned knitting machines arranged to operate at relatively high speeds.

When the speed of full-fashioned knitting machines is increased, the tendency to sinker breakage and yarn damage is increased and a point is reached when a marked breakage of the sinkers and skiving or cutting of the yarn is encountered, this point being reached much sooner in high gauge machines such as those of 51 gauge and over. This cannot be avoided by redesign of the slurring surfaces of the slur cams because the slur cams now in common use are so formed that they cannot be much further refined without causing interference of the sinkers with the thread during couliering of the loose courses in the relatively heavier yarn used for the welts and for reinforcing.

Further, in full-fashioned knitting machines of fifty-one or finer gauge, the sinkers are so thin that when the speed reaches a certain point they damage certain classes of yarns which are used from time to time in full-fashioned hosiery.

Further, irrespective of the gauge, efficient cooperation between textile machine parts operating in timed relationship, is sooner or later reduced by excessive wear when the machines are operated at high speeds; improper functioning, or damage may follow unless adjustments or replacements are made.

In a full-fashioned knitting machine, for example, wear because of high speeds soon changes the initial time relationship of the slur bar and the catchbar. If no corrective measure is provided, damage may result when the catchbar acts to draw the sinkers back at the time the jacks for some of the sinkers are held forward by the slur cam.

It has been found from experience that when the speed of full-fashioned or other flat knitting machines is increased above the present average speed, that is above about seventy to seventy-two courses per minute for fifty-one gauge machines, or seventy-six to seventy-eight courses per minutes for forty-five gauge machines, not only does the sinker breakage and yarn cutting show a marked increase in machines of fifty-one or higher gauge but the slur cams and jacks of all gauges show markedly increased rates of wear because these parts rub one on the other in use, and lubrication is seldom attempted because of the shape of the jacks and the relative position of the jacks with respect to each other and to the slur cam. Similarly, difficulty is experienced with the ordinary catchbar mechanism when it is attempted to increase the speed of the machine above a certain point, this difficulty coming from a tendency to jump or leave the cam surface on the part of the cam follower on the cam producing the back and forth motion of the catchbar. It will be understood that, in a full-fashioned or flat knitting machine, the number of courses per minute is always equal to the number of revolutions per minute of the main cam shaft.

It is an object of our invention to provide means for overcoming the mentioned and other difficulties which develop in flat knitting machines when they are operated at speeds higher than the average or normal operating speeds of these machines; that is, speeds higher than about seventy courses per minute.

Another object of our invention is to provide a high speed flat knitting machine which embodies in combination all the essential means for avoiding or overcoming difficulties most apt to be caused by high speed operation, and more particularly such means as the following:

1. Means whereby the linear speed of the slur cams is reduced relative to the number of courses per minute of the machine, that is, relative to the number of revolutions per minute of the main cam shaft.

2. Means to prevent rearward movement of the sinkers at undesired times.

3. Means to stop the machine when the slur cam and catchbar become improperly timed with relation to each other.

4. Means for preventing engagement of the catchbar with the sinkers whenever the catchbar is not in proper timed relation to the slur cam.

5. Means to move the dividers forward yieldingly and to move them rearward positively.

With these and other objects in view, which will become apparent from the following detailed description of the illustrative embodiment of the high speed knitting machine shown in the accompanying drawings, our invention resides in the novel elements, features of construction and arrangements of parts in cooperative relationship as hereinafter more particularly pointed out in the claims.

In the drawings:

Figure 1 is a rear view of a portion of a full-fashioned knitting machine having our invention embodied therein, the parts being shown in normal relative position;

Fig. 2 is a sectional view taken substantially on the line 2—2 of Fig. 1, looking in the direction of the arrows;

Fig. 3 is a view of a portion of Fig. 2 drawn to larger scale, certain parts, however, being shown in a different or abnormal relative position;

Fig. 4 is a fragmentary view taken substantially on the line 4—4 of Fig. 3, looking in the direction of the arrows;

Fig. 5 is a fragmentary view of a portion of Fig. 1 drawn to an enlarged scale;

Fig. 6 is a fragmentary view similar to Fig. 5 but with the parts positioned as in Fig. 3;

Fig. 7 is a plan view of the parts shown in Fig. 5, the parts being in normal relative position;

Fig. 8 is a plan view of the same general portion of the machine as is shown in Fig. 7, the parts, however, being in the relative positions shown in Fig. 3;

Fig. 9 is a fragmentary view taken substantially on the line 9—9 of Fig. 3, looking in the direction of the arrows;

Fig. 10 is a sectional view taken substantially on the line 10—10 of Fig. 1;

Fig. 11 is a view similar to Fig. 10, showing certain parts thereof in different relative positions;

Fig. 14 is a sectional view of the machine shown in Fig. 1 and showing the needle operating mechanism;

Fig. 15 is a sectional detail view showing the coulier cam and its followers of the machine shown in Fig. 1, and also indicating parts of a revolution of the main shaft and coulier shaft within which the couliering and knitting operations take place;

Fig. 16 is a sectional detail view showing the knitting cams on the main cam shaft of the machine shown in Fig. 1, and also indicating their followers and the parts of a revolution of the main coulier cam shaft within which the couliering and knitting operations take place;

Fig. 17 is a diagrammatic view showing the position of the slur cam and of the yarn carrier of the machine shown in Fig. 14 relative to the sinkers at different points in a traverse of the slur cam and the carriers;

Fig. 18 is a diagram representing the effective rise of the coulier cam corresponding to one revolution of the main cam shaft of the machine, shown in Fig. 1, and one stroke of the slur cam;

Fig. 19 is a diagram showing the path of the needle bar of the machine shown in Fig. 2 throughout the knitting cycle and indicating the positions of the needle bar corresponding to the positions of the slur cam shown in Fig. 17;

Figs. 20, 21, 22, 23 and 24 are views similar to Figs. 15, 16, 17, 18 and 19 respectively, but showing corresponding parts, angles, positions and paths of the coulier, knitting and slur cams, a yarn carrier and a needle bar of a standard type of full-fashioned knitting machine;

Fig. 27 is a wiring diagram of one form of electric motor which has been used for driving knitting machines having our invention applied thereto, said motor having a band type brake; and Fig. 28 is a wiring diagram of another form of driving motor which has been applied to machines including our invention; the motor of Fig. 28 having means for regenerative braking.

Figure 12:
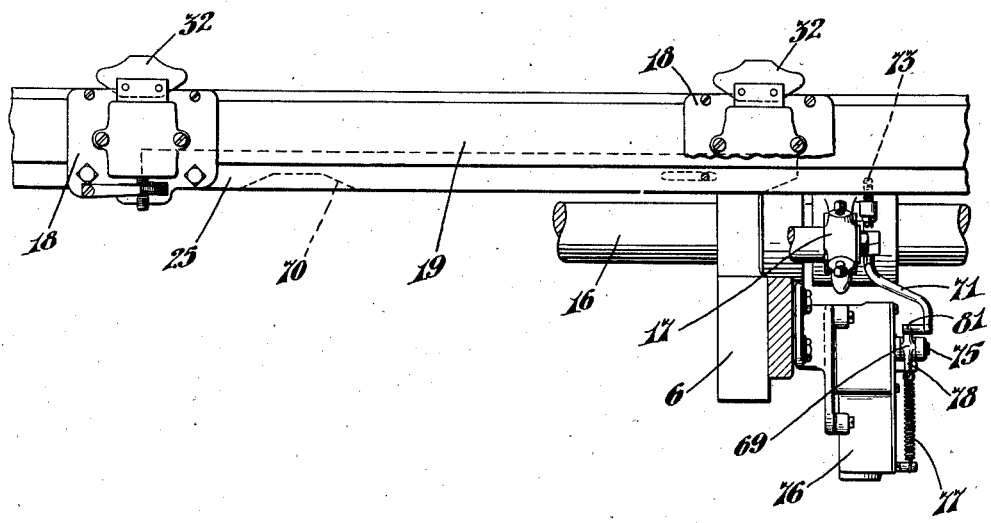
Fig. 12 is a top plan view of a portion of Fig. 1, showing certain parts positioned as in Fig. 10, parts being broken away and parts being shown in section for purposes of illustration.

In the drawings and description, only the means necessary to a complete understanding of the invention have been specifically set forth; further information as to the construcion and operation of other related, usual and well known knitting machine elements, mechanisms, etc., may be found in one or more of the following publications:

1. Pamphlet entitled "Full-Fashioned Knitting Machines," published and copyrighted by the Textile Machine Works, Reading, Pennsylvania, in 1920.

2. Three catalogs entitled "The Reading Full-Fashioned Knitting Machine Parts Catalog," published and copyrighted by the Textile Machine Works, in 1929, 1935 and 1940, respectively.

3. Booklet entitled "The Reading High-Production Full-Fashioned Knitting Machine" which forms a supplement to the above noted 1940 Parts Catalog of the Textile Machine Works, and which booklet is a publication of the Textile Machine Works, and was copyrighted by the latter in 1940.

4. Pamphlet entitled "Knitting Machine Lectures," published by the Wyomissing Polytechnic Institute, Wyomissing, Pennsylvania, in 1935.

A machine within the present invention is shown in the drawings. In said machine, the couliering mechanism has been changed compared to the ordinary couliering means to reduce the ratio of the linear speed of the slur cam during the period it is in contact with the jacks to the number of courses or numbers of revolutions of the main cam shaft for a given time unit. Further, in said machine, means is provided whereby damage is prevented in case certain parts which interfere when not in proper timed relationship, from wear or other causes, fall out of said relationship, the means for driving said certain parts being preferably designed for high speed operation. More specifically considered, the present invention is to be applied to a full-fashioned knitting machine having a couliering mechanism designed for high speed operation and the connections between the catchbar and the cam for producing back and forth movement of the catchbar are also designed for high speed operation and a safety means is provided therein which prevents the catchbar from engaging the sinkers when the slur cam and the catchbar are not moving in proper timed relation.

Further, means are shown in the drawing and are preferably provided in said machine whereby the machine is stopped in case certain parts fall out of proper timed relationship.

Referring to the drawings and more particularly Figs. 1 and 2, the knitting machine shown is in general a known form of the "Cotton" type machine now in almost universal use for making full-fashioned hose and includes a framework comprising transverse frames 6, a front beam 7, a back beam 8, a front bed 9, and a center bed 10. The operating mechanism includes a coulier cam 20 (Fig. 1) which is mounted at the rear end of a short stub shaft 21 which lies at right angles to and is driven from a main cam shaft 22 (Fig. 2) by gearing not shown. Coulier cam 20 is connected to oscillate a rock arm 23 carried by the back beam 8. Arm 23 is connected at its upper end to reciprocate a bracket 24 which is fixed both to the connecting or slur bar 25 and to the friction box rod 26. The friction box rod 26 operates through suitable means yarn carriers 11, one of which is shown in Fig. 14, for laying yarn to be knitted, while the slur bar partly operates the means for kinking the yarn, as it is laid, into partial loops on which the needles 13 may operate. The yarn kinking means are also operated in part by the catchbar 27 which is operated directly from the main cam shaft and not from the coulier cam.

The initial yarn kinking means consists of sinkers 28 which are mounted to reciprocate horizontally in a sinker bed 29, one of which is generally provided for each knitting section of the machine, and which extend longitudinally thereof. Sinkers 28 are pushed forward by jacks 30 which are swivelled on rod 31 and are themselves pushed forward by the slur cam or cock 32 which is fixed to the connecting or slur bar 25 through a slur cam or cock box 18 which slides on a fixed bar 19 and which moves in a line parallel to the sinker bed.

The sinkers 28, along with dividers 33, are retracted or moved rearwardly by the catchbar 27, but the throw or travel of the slur cam is greater than the length of the knitting field so that the cams normally overrun the sinker beds and are positioned outside the knitting field when the slur bar ends its stroke. There is consequently normally no danger of interference between the slur cam and the jacks when the latter are pushed rearwardly on the backward movement of the catchbar. If, however, the slur cam is not in proper time relation with the catchbar, the catchbar may move the sinkers rearwardly while the slur cam is in alignment with one or more sinkers, thereby damaging the parts affected.

According to the present invention damage from this cause is avoided by preventing the rearward movement of the sinkers 28 under such conditions. In the arrangement illustrated, we accomplish this purpose by preventing the catchbar from engaging the sinkers for the rearward stroke at such times when the slur cams are positioned intermediate the ends of the sinker heads. As shown, the back and forth movement of catchbar 27 is caused by cam 34 and spring 45 (Figs. 2 and 3), and the motion is transmitted from the cam though linkage comprising a roller 35, a horizontal back catchbar lever 36, a back catchbar shaft 16, a vertical lever 17, and a horizontal link 37. The spring 45 maintains the follower 35 of the lever 36 in engagement with the cam 34.

Placing the follower 35 on top of the cam 34 as shown not only minimizes its tendency to jump, but, by causing the forward movement of the catchbar and dividers to be spring actuated, cushions the action of the dividers on the loops during the forward movement of the catchbar. The up and down motion of the catchbar 27 is caused by cam 38 and spring 64, and the motion is transmitted from the cam through a roller 15, a lever 39, a front catchbar shaft 40, and a short lever 41 (Fig. 4) fixed to shaft 40 and carrying at its outer rear end an arm 42 which is pivoted thereto. Arm 42 extends upward and its upper end normally supports the front end of a link 14 which is rigidly secured to the catchbar 27. An adjustable stud 43 at the upper end of arm 42 permits of maintaining the catchbar 27 at the exact height required for proper operation of the sinkers and dividers with respect to needles 13, and a spring 44 is connected between the forward end of the link 14 and the arm 42 to keep the two normally in contact. After the sinkers 28 have been pushed forward to sink the yarn between certain needles for a course, the catchbar thrusts the dividers 33 forward to divide the yarn between the remaining needles. After the needles 13 have moved to a certain point in their cycle, the catchbar 27 is normally lowered to engage sinkers 28, as well as dividers 33, as spring 64 urges the roller 15 on lever 39 against cam 38, whereupon the catchbar 27 is then retracted or drawn rearwardly by the cam 34 acting through roller 35, and the associated linkage above set forth. It will be understood that this rearward motion, in the arrangement shown, is a positive one involving a direct power thrust of cam 34, and that the sinkers, jacks, slur cam boxes and associated parts, would consequently be damaged in those instances where the catchbar is retracted while the slur cams are positioned in the knitting field intermediate the ends of the sinker-heads. This situation would not be essentially changed by arranging the parts so as to have the springs retract the catchbar. Consequently, the only way to prevent damage due to the rearward motion of sinkers 28 under abnormal conditions is to first prevent the downward motion of the catchbar.

For this purpose, we have shown means including a bar 46 bolted to the bottom face of the connecting bar 25. Bar 46 has a rearwardly projecting lip or flange 47. As bar 46 is carried back and forth by the connecting bar 25, the lip 47 passes normally beneath and past a horizontal finger 48 fixed to the upper end of a vertical arm 49 of a forwardly extending horizontal lever 50 pivoted at 51 on a rearwardly extending horizontal arm 52 the forward end of which is fixed to the front catchbar shaft 40, so as to follow the oscillations of the shaft. At its rear end, arm 52 has a spur or finger 53 fixed thereto which serves to attach to arm 52 the upper end of a tension spring 54, the lower end of which is attached to a pin 55 on the lower end of arm 49. When unrestrained, the arm 49 and arm 52 therefore move together in response to the oscillations of the front catchbar shaft 40. If, however, finger 48 catches on flange 47, as shown in Fig. 8, due to incorrect timing of catchbar 27 relative to connecting bar 25, arm 52 locks with lever 50 to become rigid therewith on the down stroke by striking a lug 56 which projects from the side of lever 50 beneath the free end of arm 52, Fig. 9. Spring 64 is therefore unable to draw lever 39 toward cam 38 and the roller for this cam stands out from it as shown in Figure 3, the catchbar 27 therefore being held up at such a level that it cannot engage the sinkers to pull them rearwardly. A rear view of certain of the parts in the positions corresponding to Figure 3 is given in Figure 6. The flange 47 is short enough so that, when the parts are operating in proper timing, finger 48 misses it and the parts reach the positions shown in Figures 5 and 7 wherein the catchbar is able to draw the sinkers rearwardly.

Figure 25:
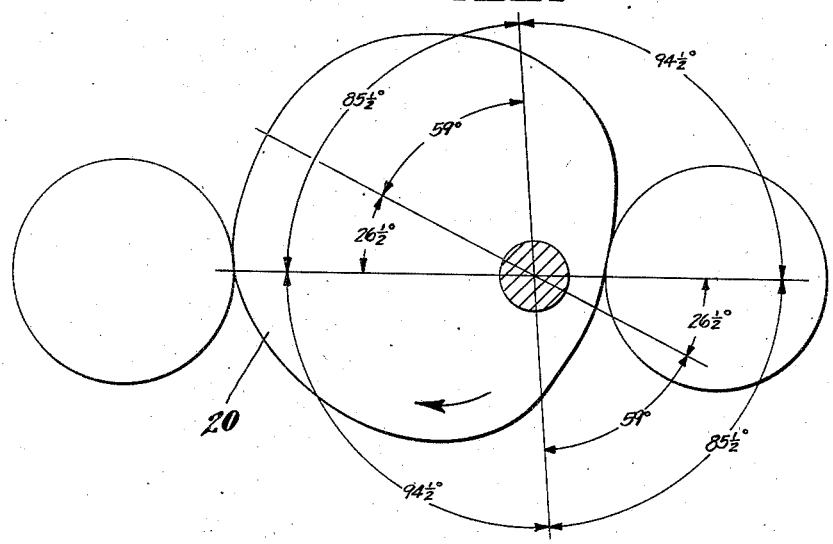
Fig. 25 is a view similar to Fig. 15, but on an enlarged scale.

It will be understood that an abnormal timing relation between the slur cam and the catchbar might conceivably result from any one of several causes, but that the most active cause is wear in the surfaces directly involved in moving the slur cams 32 while they are alongside the singer-heads. As the speed of the machine, is increased the speed of the slur cam 32 and the consequent wear are found to increase in at least as great proportion, provided no change is made in the mechanism. Further, special difficulties from sinker breakage and yarn damage soon develop in the higher gauge machines as the speed is pushed up beyond seventy courses or main cam shaft revolutions per minute. We have provided, however, a couliering means which reduces the linear speed of the slur cam during the part of the cycle compared to the ordinary arrangement for couliering. Therefore, we are able to increase the speed of the machine without increasing the sinker breakage, the yarn damage or the wear and the probability that there will be mechanical interference between any parts due to getting out of step or out of proper timed relationship. The coulier cam 20, designed for high speed operation, is shown in Figs. 15 and 25, and comprises two sections, each constituting 94½° of the surface of cams 20 which are devoted to moving the slur cam 32 along the sinker bed in contact with the sinkers while two intermediate sections, constituting 85½° of the surface of cam 20 are devoted to moving the slur cam during the periods in which the slur cam is free of the sinkers, to permit operation of the knitting needles. As the knitting cams 95 and 96, shown in Figs. 16 and 26, make a complete revolution in the same time that the coulier cam 20 makes a half revolution, the sections of the knitting cams corresponding to 94½° sections of cam 20 comprise 189° while the sections of the knitting cams corresponding to the 85½° sections of cam 20 occupy 171° of the active surfaces of the cams. This arrangement allots a greater proportion of the revolution to moving the slur cam along the sinkers than is ordinarily the case. Therefore, the number of revolutions of the cam shaft or the number of courses per minute knitted by the machine can be increased without proportionately increasing the speed of the slur cam. The speed of the needles during the knitting operation is, of course, increased even more in proportion than the increase in the speed of the machine, but we have found that this point does not in practice prevent material increases in speed of the machine above those now commonly used.

Figure 26:
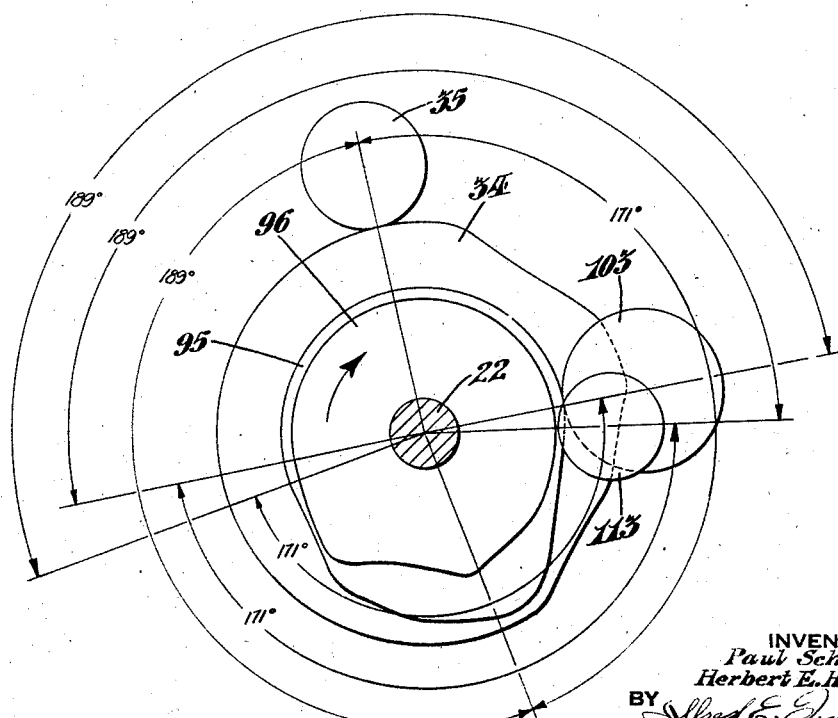
Fig. 26 is a sectional detail view similar to Fig. 16, but on an enlarged scale and showing further the cam for producing forward and rearward movement of the catchbar.

The knitting cams 95 and 96 which are used in the same machine as the coulier cam 20 are shown in Figs. 16 and 26. These figures show that the portion of the surface of each knitting cam which is of constant radius and during which therefore the needles remain stationary to permit the slur cam to be moved occupies 189°, while the portion of each knitting cam having variable radius to carry the needles through their cycle of movements occupies 171°.

By way of comparison, Figs. 20 and 21 show a coulier cam 20A and knitting cams 95A and 96A, respectively, according to an arrangement in common use. In Figs. 20 and 21, the coulier cam 20A acts during 89° of its own revolution and during 178° of the main cam shaft to move the slur cam from one end of the sinker bed to the other and it acts during 91° of its own revolution and 182° of the revolution of the main cam shaft to move the slur cam 32A, during the periods the slur cam is free of the sinkers, the knitting cams acting to move the needle banks during the latter period, or during 182° of each revolution of the main cam shaft.

The positions of the slur cam 32 and the yarn carrier 11 at different points in their cycle of movement from the left to right, and the rise of the coulier cam necessary to effect such cycle of movement, are shown diagrammatically in Figs. 17 and 18. In moving from its left hand end position, slur cam 32 takes up 53° of the revolution of the main cam shaft before engaging the first sinker at the left end of the sinker bed. At the time the slur cam engages the first sinker at the left end of the sinker bed as shown in Fig. 17, the yarn carrier 11 is ahead of the slur cam a distance corresponding to 53° of a revolution of the cam shaft, or at the point $a$. Successive positions $b$, $c$, and $d$, following position $a$, of the yarn carrier are shown on Fig. 17, corresponding to three successive positions of slur cam 32, to illustrate the continuous lead the yarn carrier maintains over the slur cam. A position $e$ shows the yarn carrier 11 at the end of its operative stroke. The distance between the sixth position of the slur cam shown in Fig. 17, i. e. the one at the right end of the sinker bed, and the seventh position, i. e. the one at the extreme right of the figure, corresponds to 118° of a revolution of the cam shaft, or 59° of a revolution of the coulier cam 20, of Fig. 15.

The positions of the slur cam 32A and the yarn carrier 11A in their cycle of movement from left to right, according to a standard arrangement, are indicated in Fig. 22, and the rise of the coulier cam 20A necessary to effect such cycle of movement is diagrammatically shown in Fig. 23. The first slur cam position shown at the left of Fig. 22, indicates the position of slur cam 32A corresponding to the position at which the slur cam 32 contacts the first sinker as shown in Fig. 17, the slur cam 32A having moved a distance corresponding to only 38° of a revolution of the cam shaft which is 11° of a revolution of the cam shaft less than the 49° movement of the slur cam, indicated by the second position of the slur cam 32A i. e., the position at which it contacts the first sinker which corresponds to a lag of 11° in back of the slur cam 32. The 49° of a revolution of the cam shaft corresponds to the 24½° indicated on the slur cam 20A of Fig. 20. The next four successive positions of the slur cam 32A are positions corresponding to the positions of slur cam 32, shown in Fig. 17, indicating the manner in which the slur cam 32A gradually overtakes the slur cam 32 so that they both leave their respective sinkerheads at the same time in strokes from left to right. In other words the two slur cams are "even" at this point, that is they have reached the same points on the respective sinker beds at the same time as the respective main cam shafts have reached the same angular position.

Within the period elapsing between the time the slur cam leaves the sinker bed and the time it reaches the sinker bed again on its next or return stroke, the needles go through a complete knitting cycle shown diagrammatically in Fig. 19. In Fig. 19, the upper horizontal dot-and-dash line indicates the position of the needles at the time the slur cam is at the right end of the sinker bed as shown in Fig. 17. In Fig. 24, the upper horizontal dot-and-dash line indicates the position of the needles when the slur cam 20A is at the right end of the sinker bed, as shown in Fig. 22.

Within the distance between the right end of the sinker bed and the extreme right of its path, the speed of the slur cam, in accordance with the invention, is appreciably reduced, covering this linear distance in 118° of the revolution of the main cam shaft, whereas it covered the linear distance from the extreme left of its path to the first contact with the sinkers in only 53°; the slur cam of the standard type machine, however, takes up 133° of a revolution of its cam shaft in moving the same distance in the same direction, as shown in Figs. 22 and 23. It will therefore be understood that the slur cam and the needles of the standard type machine at the start of their operative strokes lag behind the slur cam and the needles of the improved machine, and that when the needles 11 have reached a point 99 as indicated on the needle cycle diagram of Fig. 19, the cam 32 has reached the end of its stroke as indicated at 100 in Fig. 17, while the needle 11A has only reached the point 99A on the needle cycle diagram of Fig. 24 and the slur cam 32A has only reached the point 100A, as indicated in Fig. 22, or 15° from the end of its path or extreme right hand position, as indicated in Fig. 22. As cam 32 begins its return stroke, however, it immediately begins to lose ground to cam 32A, this being indicated at the left of Fig. 17 in which the slur cam 32 has engaged the first sinker, and being indicated in Fig. 22 in which the slur cam 32A is shown as having moved to a position 11° from the position at which it engages the first sinker. Hence, when the needles of the new type machine have returned to the starting point and the slur cam 32 has engaged the first sinker, the needles as shown in Fig. 24, are at a position corresponding to 11° from their starting position. This lag of 11° in the slur cam is indicated in Fig. 22, and is shown at the left end of the sinker bed instead of at the right end, in order to avoid showing two sets of angles at the same end, it is to be understood that except for the directions, the movements of the slur cam and needles during the right hand stroke of the slur cam are identical with those occasioned during a left hand stroke. Thus, as the two slur cams travel along their respective sinker beds, cam 32A gradually overtakes cam 32 so that they are together at the instant they leave their respective sinker beds. It follows that at the beginning of the return stroke the slur cam covers the linear distance from the extreme right of its path to the right end of the sinker bed in 53° of the revolution of the main cam shaft, this travel requiring the same number of degrees of the cam shaft as is taken up in moving from the extreme left end of its path to the sinker bed.

The path travelled by the needles 13 and needle bar 12 of each knitting section of a machine embodying our invention is shown in Fig. 19 and may be identical with that of the standard type machine, although we do not limit ourselves to this. Suitable operating connections between cams 95 and 96 and needle bar 12 are shown in Fig. 14 and comprise the usual parts as follows: a needle bar lifting arm 97 is fixed to a needle bar shaft 98 at the outer end of the arm, and the inner end of arm 97 is pivoted to the lower end of a forked hinge lever 101, the upper end of which is fixed to the needle bar 12. The shaft 98 is rocked in its bearings (not shown) by a cam lever 102 fixed to shaft 98 at the upper end of the lever. The lower end of lever 102 has a cam follower 103 thereon shown as a roller journalled on a gudgeon in the lever and arranged to run in contact with needle cam 95 so as to turn shaft 98 to raise bar 12 upon receiving an impulse from the cam. A spring 104 is connected between the lower end of lever 102 and the frame in such a way as to turn lever 102 so as to raise bar 12 when permitted by cam 95.

The horizontal motions of the needle bar 12 are caused by rocking it about the axis at the lower end of hinge lever 101. This motion is caused by swinging forwardly and rearwardly the lower end of a lever 106 the upper end of which is fixed to the needle bar. For this purpose, the lower end of lever 106 is pivotally connected to a generally horizontal link 107 which extends forwardly from lever 106 and has a notch 108 in its lower edge adapted to engage a pin which projects horizontally from the lower end of a presser lever 110, the upper end of which is fixed to a presser lever 110, the upper end of which is fixed to a presser shaft 111 mounted to oscillate on the frame of the machine. The lower end of lever 110 has a branch 112 which extends downwardly in front of the cam 96 and carries a roller 113 which acts as the follower of cam 96. A spring 114 between branch 112 and the frame urges follower 113 toward the cam 96. By this arrangement, lever 110 is swung forwardly by the cam 96 and rearwardly by spring 114, thereby transmitting to lever 106 a similar motion through link 107 to rock needle bar 12 toward and away from the presser edge. The combination of up and down motions produced by cam 95 with forward and rearward motions produced by cam 96 produces the composite motion of the needle bar shown by the curves of Figs. 19 and 24.

The relationship of cams 34, 95 and 96 is shown on a large scale in Fig. 26.

Figure 13:
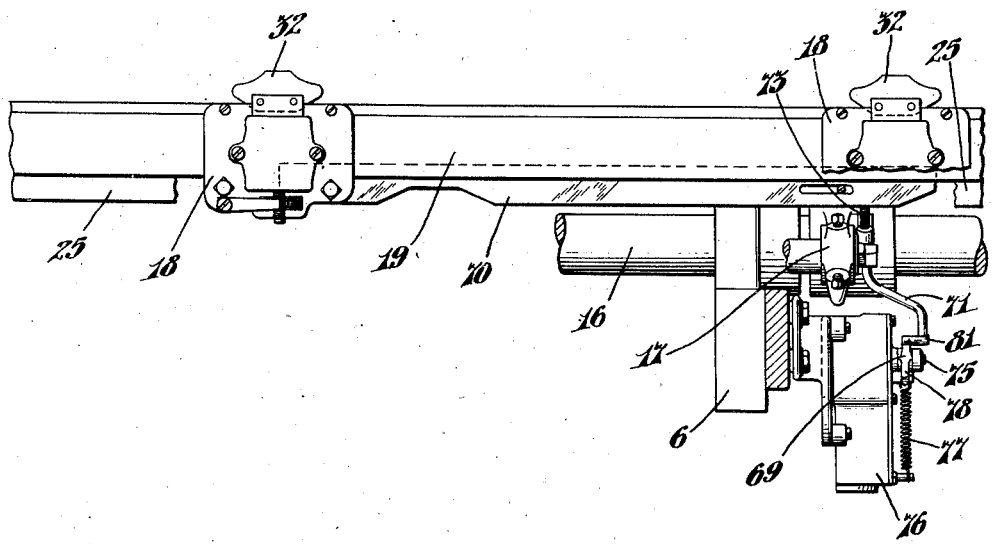
Fig. 13 is a view similar to Fig. 12, the parts, however, being shown in the same relative positions as in Fig. 11.

Whenever conditions are such that the mechanism hereinabove described prevents the catchbar from drawing the sinkers rearwardly, we prefer also to stop the motor of the machine. For this purpose, we have shown in Figs. 10 and 11 a trigger arrangement adapted to open the circuit of a holding coil for the switch of the driving motor of the machine. Said trigger arrangement is not claimed by us, per se, but may be described, for purposes of convenience, as follows: It includes a cam piece 70 (Fig. 10) fixed to the under face of connecting bar 25. A lever 71 is pivoted (Figs. 10 and 11) on one of the vertical levers 17 at point 72 and carries an adjustable tappet bolt 73 at its upper end. A spring 74 connected between the lever 71, at a point below its pivot, and a point on the upper end of vertical lever 17 holds the lever 71 normally so as to throw tappet 73 forwardly so that when the upper end of the lever 17 and the catchbar are forward the tappet 73 is in line with the low portion of the cam piece 70, as is clear from Figs. 10 and 12. In normal operation lever 17 operates at each end of the couliering stroke of bar 25 thereby moving tappet 73 forwardly and rearwardly while the latter is aligned with the low portion of cam piece 70, thereby permitting united movement of levers 17 and 71. When, however, the connecting bar and catchbar acquire the wrong relative timing, the tappet may strike the cam 70, as shown in Fig. 13. The lever 71 is then turned counterclockwise about its pivot 72 and relative to lever 17 from the position of Fig. 10 into the position shown in Fig. 11. In so changing its position, the lower end of lever 71 turns to some extent a three armed lever 69 which is fixed to the outer end of a pivoted shaft 75 extending into a box 76 within which is a pair of relay contacts closing the circuit of a holding coil which normally holds the switch of the machine motor 119, Fig. 14, in closed position as hereinafter set forth. Shaft 75 is normally held in the proper angular position for keeping the circuit of the holding coil closed by a tension spring 77 which is connected between a point on the outside of box 76 near the lower left hand corner thereof and an arm 78 of lever 69. Spring 77 therefore tends to turn shaft 75 in the counterclockwise direction and thereby keeps an arm 79 of lever 69 against a stop 80 on the box 76 to maintain the shaft 75, for the most part, in a given desired angular position in which relay contacts within box 76 are closed. When lever 71 is turned from the position shown in Fig. 10 to that which it occupies in Fig. 11, its lower end pushes against an arm 81 of lever 69. The shaft is thereby given a temporary movement, first clockwise and then counterclockwise, by the lever 71 and the spring 77 respectively, thereby opening the relay contacts and breaking the circuit of the holding coil. A spring attached to the switch for the machine motor thereupon opens the motor circuit and simultaneously opens the circuit of said holding coil to stop the machine. The main switch must therefore be reset before the machine motor can start again.

The simplified circuit of the motor 119 and cam actuated stop means is shown in Fig. 27. As is clear from Fig. 27, shaft 75 has a band 115 fixed thereto on the end of the shaft within box 77 in addition to the arm or lever 81 fixed to the end of the shaft outside the box. The band 115 surrounds and supports a flask 116 forming part of an emergency switch 117 in which is a body of mercury adapted, when the shaft 75 and flask 116 are in the angular position shown in Fig. 27, to cover and so close a circuit across two contacts 118 at one end of the flask 116. Said contacts are in a control circuit for a brush shifting variable speed motor 119 for driving the knitting machine. Motor 119 is of the induction type having the primary winding in the rotor. The motor 119 has its secondary winding on the stator and has a rotor shaft 121, at one end of which is a brake drum 122 with which a brake band 123 is adapted to cooperate. A spring 124 is adapted to draw the brake band against the drum 122 and acts to stop the armature shaft as soon as the current is turned off the motor.

Current for motor 119 is supplied through a three phase circuit 125, the three wires or leads A, B and C of which run through an electro-magnetic switch 126 to rings 127 on the opposite end of shaft 121 from the one having brake drum 122 thereon. A three pole hand switch 128 is arranged between electro-magnetic switch 126 and the source of current, switch 128 being shown closed in Fig. 27. However, switch 126 does not close merely upon closing switch 128, although switch 126 must be closed to throw motor 119 into operation. Switch 126 is biased to open position by a spring 129 and is closed by a hand operated starting switch or button 131. Switch 131 is biased to the open position and is arranged in a control circuit beginning at point 132 on lead A extending through lead 133 to switch 131 and thence through junction point 134 and a push-button or hand operated stop switch 135 which is biased to the closed position and thence through lead 136 and solenoid winding or holding coil 137 of switch 126 to lead B at point 138. Therefore, upon closing switch 131, coil 137 is energized and pulls a rod or plunger 139 of switch 126 downwardly against the pull of spring 129 and thereby closes gaps in leads A, B and C so as to extend the main supply circuit to the rings 127 by means of extension leads D, E and F, respectively.

As soon as current is thrown on the rings 127, the brake band 123 is relaxed by a solenoid 141 whose movable core 142 is connected through a lever 143 and a rod 144 so that rod 144 overcomes the pull of spring 124 when core 142 is drawn downwardly because of the excitation of solenoid 141. Solenoid 141 is automatically excited by the closing of a circuit through the solenoid starting from the point 145 on lead D and running through lead 146 to the solenoid 141. From the solenoid its energizing or exciting circuit extends through lead 147 to lead B at point 138. At the same time switch 126 closes the circuit for motor 119, it also closes a holding circuit for maintaining switch 126 in position to pass current to motor 119. The circuit for this purpose leads off of lead D at the point 148 by a short lead 149 which extends to the motor side of a gap in switch 126 which is closed so long as the coil 137 is energized. Beyond switch 126 the holding circuit for this switch continues along a lead 151 to one of contacts 118 of switch 117. From the other contact 118, the holding circuit continues through a lead 152 to point 134 in the starting circuit. From point 134, the holding circuit for switch 126 is identical with the starting circuit and need not be traced further. Therefore, the starting switch 131 need be held closed only momentarily in order to establish the holding circuit through switch 126 coil 137 and switch 131 may then be allowed to open. However, when arm 71 is turned to break the holding circuit at the emergency switch 117, spring 129 immediately breaks the circuit to motor rings 127 and, at the same time breaks the circuit through the brake releasing solenoid 141 because one end of the solenoid circuit is between switch 126 and the motor, so that brake band 123 is immediately drawn against brake drum 122 by spring 124 to stop motor 119 upon opening of the holding circuit for switch 126.

The holding circuit for switch 126 may also be broken at hand operated switch 135 whenever it is desired to stop motor 119 in the ordinary course of operations. It will be understood that switches 131 and 135 are shown only diagrammatically and are actually connected to be operated from a swivelled control rod on the knitting machine.

We have also employed for driving machines according to the invention a modified form of the motor shown in Fig. 27, the wiring diagram for which is shown in Fig. 28. The motor according to Fig. 28 has a regenerative braking means instead of the band brake shown in Fig. 27, the motor of Fig. 28 being otherwise an induction motor of the same general type as the one shown in Fig. 27 and having the primary circuit on the rotor and the secondary circuit on the stator. In Fig. 28, the three phase power supply line is indicated at 130 and includes three wires or leads G, H, and J in which is a hand operated disconnect switch 128A. Leads G, H and J extend to the contacts of an electro-magnetic switch 126A which extends the power circuit through extension leads K, L and M, respectively to rings 127A on the shaft 121A of motor 160, the rings 127A being indicated diagrammatically in Fig. 28 by large dots and the shaft and stator being indicated in Fig. 28 only by dot-and-dash lines. The rings 127A feed a primary winding (not shown) of ordinary induction type creating a revolving field which excites the secondary winding on the stator of the motor, said secondary winding being in two separated coils 161 and 162 arranged 90 electrical degrees apart. The rotor carries also a closed drum winding 210, known as an adjusting winding, connected at spaced points to the segments of a commutator 211, there being four brushes 212, 213, 214 and 215 on said commutator connected each to an end of one of coils 161 and 162, said brushes being arranged on the commutator 211 so that the brushes connected to coil 161 alternate with those connected to coil 162. Also, brushes 212, 213, 214 and 215 embrace only roughly 180° of the circumference of the commutator 211. Further, mechanical connections (not shown) are provided whereby the brushes may be shifted to vary the speed, the motor having otherwise "shunt" speed-load characteristics in that its speed varies relatively slightly compared to the load. For braking purposes, two additional brushes 216 and 217 are provided on the commutator 211, brush 216 being connected to the midpoint of coil 162 and the other, 217, to the same end of coil 162 as brush 212. Since the brushes for running conditions connected to the ends of coils 161 and 162 are arranged on only about 180° of the circumference of the commutator while the brushes 216 and 217 for braking purposes are arranged on the other half of the commutator, both of brushes 216 and 217 lie between two of the running brushes. The brushes for braking are, however, disconnected from the commutator when running by an electro-magnetic switch or contactor 241.

Assuming motor 160 to be stationary it may be started, after closing hand operated switch 128A, by moving a normally open push button starting switch 131A to closed position. A circuit is thereby closed for operating a control relay or electromagnetic switch 163, said operating circuit beginning at point 164 on power lead G and extending through a short lead 165 to one side of a gap in switch 126A which, however, is open at the time of starting. From switch 126A, the starting circuit continues through a lead 166 to one end of an operating and holding solenoid coil 167 for relay 163. From the other end of coil 167, the starting circuit continues through lead 168 to the starting push button 131A. This being closed, the circuit continues past junction point 169 and through the normally closed stop button 171, to lead 172 and to one side of a mercury switch 173 which is normally closed although adapted to open the circuit when desired. From the other side of switch 173, the circuit continues through a short lead 174 to one side of mercury switch 117A. Switch 117A is of the same construction as switch 117 and is operated from a cam on the connecting bar of the machine the same as is switch 117, the only distinction being that switch 117A is in an operating circuit of relay 163 whereas switch 117 is in the operating circuit of the main line switch or contactor 126. From the other side of switch 117A, the control circuit extends through a lead 180 to an overload relay 175 adapted to open the control circuit when its temperature is raised to a certain limit by an element connected in the circuit of coil 162. From overload relay 175, the control circuit is extended by a short lead 176 to a second similar temperature operated overload relay 177 whose heating element is in circuit with coil 161. From relay 177, the control circuit extends through leads 178 and 179 to point 181 on the power lead J.

A circuit having thus been closed through coil 167, it draws the core or rod 182 of relay 163 toward the left as viewed in Fig. 28 against the pull of a spring 187 to thereby close a holding circuit around the starting push button 131A which runs from one side of the starting push button through a lead 183, a normally closed mercury switch 184 and a lead 185 to and through the relay 163. From the other side of switch relay 163 a lead 186 extends the holding circuit to the point 169, at which point the holding circuit unites with the starting circuit, the holding circuit and the starting circuit being identical from the point 169 to the point 181 on power lead J as previously traced.

The rod 182 of relay 163 having moved to its left hand position, a circuit is established through the operating and holding coil 137A of line switch or contactor 126A as follows: from a point 188 on power lead G through a lead 189 containing two rectifiers 191 and 192 to a junction or branch point 193. From point 193, the circuit for coil 137A extends through a short lead 194, through the coil itself and lead 195 to point 196. From point 196, the circuit extends through a short lead 197 to a gap in relay 163. Relay 163 being in its left hand position, the gap is closed and the circuit continues from relay 163 through leads 198 and 199 to a junction with lead 179 from which point it is identical with the circuit for coil 167, extending through lead 179 to point 181 on power lead J. Coil 137A having been energized by the closing of the gap between leads 197 and 198, it draws rod or plunger 139A to the right as viewed in Fig. 28 against the tension of spring 129A to close the power leads running to the rings 127A on the rotor shaft of motor 160. At the same time that the main power circuit is closed, switch 126A closes a gap in the switch between the lead 165 and a lead 201 and thereby extends a control circuit from point 164 on power lead G along leads 165 and 201 to one side of an operating and holding coil 203 of a relay or electro-magnetic switch 204. From the other side of coil 203, its circuit extends along a lead 205 to one side of a gap in relay 163. On the other side of relay 163, the circuit of coil 203 continues through a short lead 206 to a junction point 207, from which point the circuit of coil 203 becomes identical with that of the holding circuit of coil 167 ending at point 181 on power lead J and which has already been traced.

Coil 203 acts when energized as the operating and holding means of the relay or electro-magnetic switch 204 which controls the connections between one end of coil 161 and brush 215 as well as between both ends of coil 162 and brushes 212 and 213. Relay 204 does not affect the connection between secondary coil 161 and brush 214.

Coil 203 serves to draw a central rod of plunger 219 of relay 204 toward the right as viewed in Fig. 28 against the tension of a spring 221 which tends to hold the rod 219 in such position that there are gaps in the leads between coils 161 and 162 and the brushes 212, 213 and 215. When coil 203 is energized, therefore, spring 221 is overpowered and the gaps in the leads from coils 161 and 162 are closed to connect the coils with brushes 212, 213 and 215 to transmit current from said coils to said drum winding 210 on the rotor to establish running conditions in motor 160. The leads from coils 161 and 162 for this purpose comprise the following: From the right hand end of stator coil 161 as viewed in Fig. 28, a lead 218 extends to a normally closed gap member 222 of contactor or electro-magnetic switch 230, the holding coil of which is indicated at 220.

On the other side of gap member 222, the circuit of coil 161 is continued by lead 223 which extends the circuit to relay 204. From relay 204 the circuit of coil 161 is continued by a short lead 224 to a heating element 225 in the overload relay 177. From heating element 225, the circuit from the right end of coil 161 continues through lead 226 to brush 215 on the commutator 211. The left end of coil 161 connects through lead 227 directly with brush 214, thus completing the circuit of the coil 161 through commutator 211 and winding 210. Similarly the running circuit of coil 162 extends from the upper end of the coil as viewed in Fig. 28 through lead 228 to relay 204. From relay 204, the circuit of coil 162 continues through lead 229 to brush 212 on commutator 211. From the lower end of coil 162 as viewed in Fig. 28, its circuit extends through a lead 231 to a normally closed gap member 232 in switch 230. From switch 230, the circuit of coil 162 is extended toward the commutator 211 through lead 233 to the relay 204. From relay 204, the circuit of coil 162 is extended through a short lead 234 to one side of a heating element 235 in the overload relay 175. From the other side of heating element 235, the circuit of coil 162 is extended by lead 236 to brush 213 on commutator 211. The circuit of coil 162 is therefore closed between brushes 212 and 213 through the comutator 211 and adjusting winding 210 on the rotor of motor 160.

As indicated on Fig. 28 of the drawing or diagram, leads 218 and 223 have a resistance 237 connected in parallel therewith and leads 231 and 233 have a resistance 238 connected in parallel therewith. The switch 230, in addition to the members 222 and 232, includes a rod or plunger 239 and a spring 240 adapted to hold plunger 239 in such position that members 222 and 232 close gaps between leads 218, 223 and 231, 233, respectively, so long as coil 220 is not energized.

When the switch 128A is closed, the coil 220 is energized to open the switch 230 by closing the circuit starting at point 188 on line G, through rectifiers 191 and 192 to line 258 at point 193, and to and through the switch 230 to line 259 and to the coil 220. From coil 220, the circuit of coil 220 extends through line 261 to the normally closed portion of switch 204, from switch 204 through a short lead 262 to one side of a limit switch which is normally closed and which is indicated diagrammatically at 263. From the other side of limit switch 263, the circuit of coil 220 extends through a short lead 264 to a junction with lead 178 at point 265. From point 265, the circuit of coil 220 becomes identical with that of coil 167, extending along leads 178 and 179 to point 181 on power lead J. After the coil 220 is energized to open switch 230 the coil is maintained energized by a holding circuit passing from the line 258 at a point 276 through line 275 to a resistance 274 and from the resistance through lines 273 and 259 to coil 220 and from coil 220 as hereinbefore traced.

Upon closing starting button 131A, coils 137A, 167 and 203 are energized, and coil 220 is de-energized by breaking a circuit through the switch 204 as hereinbefore described, beginning at the power line G and ending at line J. Therefore, starting with the switches all as shown in Fig. 28, that is with all the actuating coils de-energized except coil 220, upon closing the starting switch 131A, switches 163, 126A and 204 all close, and switch 241 remains practically unaffected. Switch 230, however, is at this time energized and open thereby forcing the secondary currents from coils 161 and 162 to pass through the resistances 237 and 238 and limiting their flow. As the circuit of coil 220 is opened between leads 261 and 262 as soon as coil 203 actuates rod 219 of switch 204, unless means were provided to prevent it, coil 220 would be immediately de-energized due to the energizing of coil 203, with the result that gap members 222 and 232 would not remain open long enough to permit resistances 237 and 238 to be of practical use during the period of acceleration. To prevent the immediate de-energization of coil 220 and consequent shunting of resistances 237 and 238, means are provided to delay the de-energization of coil 220 comprising a capacitor 266, one side of which is connected to lead 258 at point 267. On the opposite side of capacitor 266 from point 267, a circuit continues through a lead 268 to a resistance 269. From the other side of resistance 269 from capacitor 266, the circuit of said capacitor continues through a lead 271 to a junction point on the opposite side of coil 220 from lead 259.

If, however, the current in either of the secondary circuits including coils 161 and 162 remains above a certain average value for any length of time during running conditions, element 225 and 235 heats up enough to cause the overload relay 177 or 175 to open the circuit of coil 167 of relay 163 and thereby shut down the motor by cutting off the current to the holding coils 137A and 203 of switches 126A and 204.

The circuit of coil 167 may be interrupted also by opening the holding circuit therethrough at either the stop button switch 171 or the mercury type emergency switch 117A, the latter being operated by the lever 71 as described hereinabove whenever the slur or connecting bar and the catchbar fall out of their proper timed relation. Further, special switches 173 and 184 are shown in the circuit of coil 167 for stopping motor 160 under certain conditions not connected with the present invention.

If, from whatever cause, the circuit of coil 167 of relay 163 is opened the motor will be shut down, but, unless some braking means is provided, it may turn over long enough after the circuit of coil 167 has been broken to do damage, if any parts have fallen out of their proper timed relation. Therefore, in Fig. 28, I have shown diagrammatically an electrical braking means which stops the rotor quickly upon breaking the circuit of coil 167 in relay 163 but which permits the rotor of the motor 160 to be turned readily by hand when desired if the motor has stopped and the power circuit is open. The production of electrical or regenerative braking involves holding power switch 126A closed for a while after relays 163 and 204 have opened and further involves closing a gap or gaps in the circuit of brushes 216 and 217. For the latter purpose, a relay 241 is provided having an operating and holding coil 242 which is energized only when coil 137A of switch 126A remains energized at the same time that coils 167 and 203 of relays 163 and 204 respectively have been de-energized and means is provided for maintaining coil 137A energized even though its circuit is broken at switch 163, as hereinafter set forth. Under these conditions, a circuit is established which begins at point 164 on power lead G extends through lead 165 to switch 126A, through switch 126A to lead 201 and thence along lead 201 to a branch point 243, the circuit of coil 242 from point 164 to point 243 being identical with that of coil 203. At point 243, the circuit of coil 242 branches from lead 201 and extends along a short lead 244 to one side of coil 242. From the other side of coil 242, the circuit thereof is extended by a lead 245 to a gap in relay 163. On the other side of relay 163, the circuit of coil 242 is continued by a lead 246 which joins, at point 247, the lead 199 forming part of the circuit of coil 137A. The circuit of coil 242 therefore continues from point 247 along leads 199 and 179 to point 181 on power lead J. However, as it is assumed that coil 167 is de-energized by a break at switch 171 or 117A and that coil 137A remains energized, rods 139A and 182 are both in their right hand positions and the gap between leads 165 and 201 is closed by switch 126A while that between lead 245 and 246 is closed by switch 163. Therefore, the coil 242 of relay 241 is energized and remains so as long as coil 137A remains energized. Therefore coil 242 draws rod or plunger 248 of relay 241 downward as viewed in Fig. 28 and a regenerative braking circuit is established as follows: from the mid-point of secondary coil 162 along a lead 249 to a lower gap in relay 241. This being closed, the circuit continues along a lead 251 to brush 216 on the commutator 211. From the upper end of coil 162 as viewed in Fig. 28, a lead 252 extends to an upper gap in relay 241. This being closed, the braking circuit continues through a lead 253 to a resistance 254. From resistance 254, the braking circuit continues through lead 255 to brush 217 on commutator 211. The braking circuit therefore is completed through the adjusting winding 210 when coil 242 is energized and the resistance 254 prevents too great a braking current from flowing.

In order that a braking current be generated in the motor the power circuit to rings 127A must remain closed and the opening of switch 126A must therefore be delayed for several seconds after the relays 163 and 204 have dropped out. For this purpose, coil 137A of switch 126A is shunted through capacitors 256, 256, a lead 257 contributing to this end by connecting branch point 196 on one side of coil 137A with the capacitors 256 and a lead 258 serving the same end by connecting branch point 193 on the other side of coil 137A with said capacitors.

As hereinbefore noted, the circuit of coil 220 of switch 230 contains a limit switch 263. Switch 263 is normally closed, but is so connected to the means for shifting brushes 212, 213, 214 and 215 that, when said brushes are set for slow speed, switch 263 is opened. This is because the starting current of motor 160 is low when the brushes are set for slow speed and there is therefore no need to operate switch 230 to open the gaps at 222 and 232 because there is no need to throw resistances 237 and 238 into circuit. Switch 263 being open coil 220 of switch 230 is not energized and resistances 237 and 238 remain short circuited.

Further details concerning motors 119 and 160 may be found in instruction pamphlets GEI-7379 and GEI-13115 issued by the General Electric Company, Schenectady, N. Y., September, 1934, and June, 1940, respectively.

It will be understood that it is sometimes desired to lock the catchbar in inoperative position, and although no part of the present invention, I have shown (Fig. 2) manual means for this purpose comprising a hand lever 85 which is fixed to the front catchbar shaft 40. By depressing the forward end of lever 85, the front catchbar shaft is turned clockwise as viewed in Fig. 2 and the catchbar may thereby be raised above the level at which it engages the sinkers. In order to hold the catchbar at this upper level as long as desired, a latch lever 86 is provided which is pivoted to lever 85 at about midway of the length of lever 85. Lever 86 has a hook 87 at its upper end and at the lower edge of the mouth 88 of said hook is a shoulder 89. A tension spring 90 connected between levers 85 and 86 urges lever 86 rearwardly so that shoulder 89 normally presses against a shaft 91. The parts, however, are so proportioned that so long as the front catchbar shaft 40 has not been turned farther than it is normally turned by its cam, the shoulder 89 merely moves up and down against the front side of the shaft 91, but without catching thereunder. When, however, lever 85 is sufficiently depressed, shoulder 89 slips into latching position beneath shaft 91 and is so held by spring 90 to hold the catchbar in its uppermost position until the lever 86 is released from its latching position by the operative. The upper lip or jaw of hook portion 87 prevents the lever 85 from being accidentally depressed too far by the operative.

As hereinabove indicated, the motors 119 and 160 are connected to the machine to give it a full operating speed corresponding to more than sixty courses per minute.

Of course, the improvements specifically shown and described by which we obtain the referred to results, can be changed and modified in various ways without departing from the invention herein disclosed and hereinafter claimed.

We claim:

1. In a full-fashioned knitting machine, in combination, a slur bar having a projection thereon, an oscillating front catchbar shaft, a lever on said shaft having a cam follower thereon, a spring urging said lever in the direction to carry said cam follower toward its cam, a second lever fixed to said shaft, a third lever pivoted on said second lever and having a portion having a finger normally passing above the level of said projection at one point in its path and dropping below it in another, a spring connection between said second and third levers for holding said portion in position to enable it to pass above said projection, and means rendering said third lever rigid with said second lever if said finger catches on said projection to interrupt the action of said first spring.

2. In a full-fashioned knitting machine, a safety means comprising a lever adapted to be attached to a shaft, a second lever pivoted so as to move in a plane parallel to the plane of movement of said lever, a spring arranged between said levers to exert a torque thereon, a projection on one of said levers arranged to limit the movement of said second lever in response to said spring, and a finger fixed to said second lever and adapted to prevent both said levers from turning when said finger catches on an unyielding object.

3. A straight-bar knitting machine comprising in combination, needles, a thread guide, jack and dividing sinkers, a catch-bar adapted to withdraw the jack sinkers as well as to advance and withdraw the dividing sinkers, a catch-bar raising and lowering shaft, means to angularly adjust the latter, means to advance and withdraw the catch-bar, jacks to advance the jack sinkers, draw mechanism to operate the jacks and thread guide, an arm on the catch-bar raising and lowering shaft and means operated by the draw mechanism with respect to which said arm moves freely while the draw mechanism is operating in correct timing to engage with the arm to hold the shaft with the catch-bar in its highest position during the operation of the draw mechanism if the timing of the draw mechanism becomes wrongly adjusted.

4. In a straight knitting machine having a catch-bar having both back and forth and up and down motions, a slur cam having a reciprocating motion transverse to that of the back and forth motion of the catchbar, and a sinker bed having sinkers therein along which the slur cam travels, the slur cam normally coming to rest outside the ends of said sinker bed, the combination with said catchbar of means for interrupting the downward motion thereof whenever said slur cam fails to pass the sinker at the farther end of the sinker bed in the direction of its travel before the backward motion of said catchbar and comprising a hook having a motion in the vertical direction and means to hold said hook near its top position when said slur cam is in contact with the sinkers, and means connected to said hook to prevent the downward motion of the catchbar while the hook is held by said means.

5. In a straight knitting machine having a cathbar having back and forth and up and down motions, a slur cam having a motion transverse to that of the catchbar, and a sinker bed having sinkers therein along which the slur cam travels and adapted to be drawn rearwardly by said catchbar, the slur cam normally being outside the ends of the sinker bed during the downward and backward movements of said catchbar, the combination with said catchbar, means for preventing the catchbar from engaging the sinkers when said slur cam lies between vertical planes perpendicular to the main cam shaft and at the ends of the sinker bed comprising a member connected to travel synchronously with the slur cam, a front catchbar shaft and means connected therewith for supporting said catchbar, a yieldable means tending to rotate said front shaft normally in the direction in which said catchbar is lowered, a finger adapted to catch on, and supporting itself on, said synchronous member when said slur cam and said catchbar are out of proper time relation to each other, and means connecting said finger to said front catchbar shaft to hold the shaft against said means when the slur cam and catchbar are out of relative timing to prevent the catchbar from being lowered sufficiently to engage the sinkers.

PAUL SCHMIDT.
HERBERT E. HAEHNEL.

REFERENCES CITED

The following references are of record in the file of this patent:

UNITED STATES PATENTS

| Number | Name | Date |
|---|---|---|
| 2,187,715 | Waechtler | Jan. 23, 1940 |
| 2,186,197 | Hoppner | Jan. 9, 1940 |
| 2,127,449 | Richter | Aug. 16, 1938 |
| 2,059,667 | Waechtler et al. | Nov. 3, 1936 |
| 1,911,833 | Lieberknecht | May 30, 1933 |
| 1,830,718 | Richter | Nov. 3, 1931 |
| 2,233,801 | Wickardt | Mar. 4, 1941 |
| 2,143,486 | Lieberknecht | Jan. 10, 1939 |
| 2,015,106 | Gastrich | Sept. 24, 1935 |
| 2,114,955 | Carlson | Apr. 19, 1938 |
| 2,266,135 | Weisbecker | Dec. 16, 1941 |
| 2,270,361 | Waechtler | Jan. 20, 1942 |

FOREIGN PATENTS

| Number | Country | Date |
|---|---|---|
| 392,860 | Great Britain | May 25, 1933 |